(12) United States Patent
Segi et al.

(10) Patent No.: US 7,513,272 B2
(45) Date of Patent: Apr. 7, 2009

(54) SOLENOID VALVE

(75) Inventors: Masaya Segi, Okazaki (JP); Mikio Suzuki, Hekinan (JP); Masaru Suzuki, Chiryu (JP)

(73) Assignee: JTEKT Corporation, Osaka (JP)

( * ) Notice: Subject to any disclaimer, the term of this patent is extended or adjusted under 35 U.S.C. 154(b) by 461 days.

(21) Appl. No.: 11/092,563

(22) Filed: Mar. 29, 2005

(65) Prior Publication Data
US 2005/0217740 A1    Oct. 6, 2005

(30) Foreign Application Priority Data
Mar. 30, 2004   (JP)   ............................. 2004-099094

(51) Int. Cl.
F15B 13/044    (2006.01)
(52) U.S. Cl. ............................. 137/625.65; 251/129.15
(58) Field of Classification Search ............ 137/625.65; 251/129.15; 335/278
See application file for complete search history.

(56) References Cited

U.S. PATENT DOCUMENTS

| | | | | |
|---|---|---|---|---|
| 3,665,963 | A | | 5/1972 | Dick |
| 4,316,599 | A | * | 2/1982 | Bouvet et al. .......... 137/625.65 |
| 5,309,944 | A | * | 5/1994 | Chikamatsu et al. ... 137/625.65 |
| 5,878,782 | A | * | 3/1999 | Nakajima ............... 137/625.65 |
| 6,612,544 | B2 | * | 9/2003 | Sakata et al. ........... 251/129.15 |
| 6,953,186 | B2 | * | 10/2005 | Kaneda et al. ......... 251/129.15 |
| 2002/0101314 | A1 | | 8/2002 | Oishi et al. |
| 2003/0047699 | A1 | | 3/2003 | Sakata et al. |

FOREIGN PATENT DOCUMENTS

| | | | |
|---|---|---|---|
| DE | 100 51 614 A1 | | 4/2001 |
| EP | 1 134 471 A2 | | 9/2001 |
| GB | 2243488 | * | 10/1991 ............ 251/129.15 |
| JP | 58-21070 | * | 2/1983 ............ 137/625.65 |
| JP | 64-79483 | * | 3/1989 ............ 251/129.15 |
| JP | 64-87983 | * | 4/1989 ............ 251/129.15 |
| JP | H01-242884 | | 9/1989 |
| JP | 2-46384 | * | 2/1990 ............ 251/129.15 |
| JP | 2-138583 | * | 5/1990 ............ 137/625.65 |
| JP | 4-272587 | * | 9/1992 ............ 137/625.65 |
| JP | 2002-310322 | | 10/2002 |

* cited by examiner

*Primary Examiner*—John Rivell
(74) *Attorney, Agent, or Firm*—Oblon, Spivak, McClelland, Maier & Neustadt, P.C.

(57) ABSTRACT

A solenoid valve comprises a solenoid portion 10 and a valve portion 20. The solenoid portion 10 is constructed by a stator core 12, an electromagnetic coil 14 and a plunger 15. The valve portion 20 is constructed by a valve sleeve 21 and a spool 25 axially forming plural lands 26a-26c in series. The plunger 15 is axially moved by electromagnetic attraction and drives the spool 25. There are formed the same pressurized areas at the plunger 15 and the land of the spool 25 closest to the plunger 15. Therefore, the volume in an intermediate space B between the plunger 15 and the spool 25 is constant and contaminants in the oil are not sucked into the intermediate space B.

8 Claims, 5 Drawing Sheets

SOLENOID VALVE

INCORPORATION BY REFERENCE

The present application claims priority under 35 U.S.C. §119 to Japanese Patent Application No. 2004-099094, filed on Mar. 30, 2004. The contents of that application are incorporated herein by reference in their entirety.

BACKGROUND OF THE INVENTION

1. Field of the Invention

This invention relates to a solenoid valve whose sliding plunger makes a valve spool move.

2. Discussion of the Background

A conventional solenoid valve may be installed into an electronically controlled automatic transmission. The solenoid valve is inserted into a valve body formed in an oil pan of the automatic transmission. Japanese patent laid open 01-242884 is prior art disclosing such a solenoid valve. The prior art solenoid valve includes a solenoid portion and a valve portion. In the solenoid portion, there is a stator core which is coaxially constructed by a core and a yoke in series. A bore is formed at the axial center of the stator core, and a plunger is slidably fitted into the bore. The valve portion coaxially adjoins the solenoid portion and is constructed by a valve sleeve and a spool slidably fitted into the valve sleeve. The plunger is axially moved against a spring by an electromagnetic coil through the magnetized stator core and moves the spool. The solenoid valve has a cover to separate the solenoid portion from the valve portion. There is a space surrounded by the bore, one end of the plunger and the cover. The volume in the space changes due to the sliding of the plunger. In a conventional solenoid valve, the space is connected with the outside via an inlet/outlet passage to absorb the volume changes, so that contaminants in the oil may be sucked into the space from the outside.

In the prior art, since the plunger slides in the bore, the contaminants may become lodged between the bore and the plunger, whereby the plunger may lock. To resolve such a problem, the plunger of the prior art is constructed by a magnetic hollow slide and one end of a shaft is inserted into the slide. The other end of the shaft projects from the slide and is inserted into a concave portion of the spool. Therefore, there reliably exists a gap between the slide and the bore of the stator core. However, the wider gap increases the magnetic reluctance in the magnetic circuit, which reduces magnetization of the stator core and the slide. Therefore the magnetic attraction force to the plunger is reduced and the valve characteristics become unstable, or the electromagnetic coil must become larger to obtain suitable valve characteristics.

To resolve the above problem, in Japanese laid open 2002-310322 a diaphragm is disposed at one end of the spool next to the plunger in order to prevent the contaminants from being sucked in. In addition, a cover is disposed at the end of the plunger opposite to the spool and a breathing port is formed in the cover to connect the inside/outside of the solenoid portion. In the second prior art, however, the diaphragm requires a rubber material which has oil resistance and soft elasticity even in a high/low temperature environment, whereby its product costs are higher.

SUMMARY OF THE INVENTION

In view of the foregoing, it is an object of the present invention to provide an improved solenoid valve. In order to achieve the above and other objects, an aspect of the present invention provides a solenoid valve comprising a solenoid portion and a valve portion. The solenoid portion is constructed by a stator core, an electromagnetic coil and a plunger. The valve portion is constructed by a valve sleeve and a spool axially forming plural lands in series. The plunger is axially moved by electromagnetic attraction and drives the spool. The pressurized areas of the plunger and the land of the spool closest to the plunger have the same areas. Therefore, the volume in an intermediate space between the plunger and the spool is constant and contaminants in the oil are not sucked into the intermediate space.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
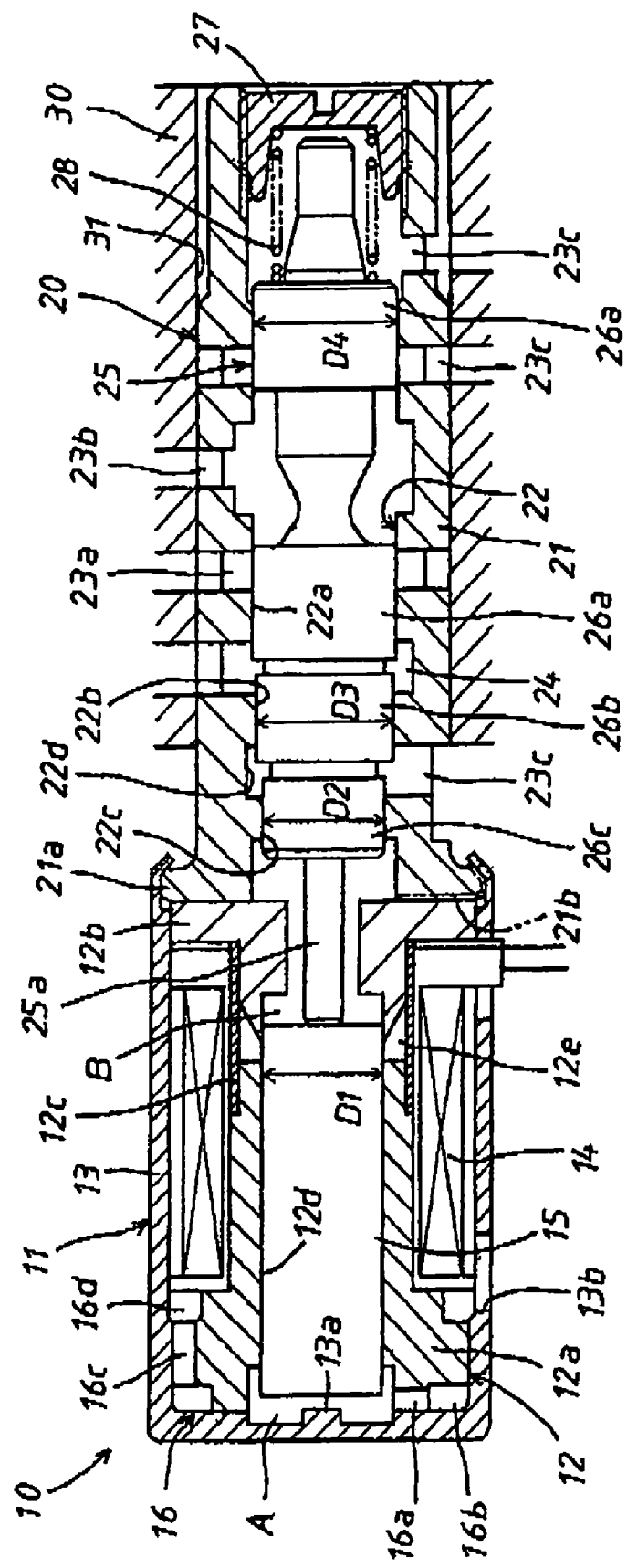
FIG. 1 is a longitudinal section view of a first embodiment of a solenoid valve related to the invention.

A first embodiment of the present invention will be described with reference to FIG. 1. A solenoid valve of the first embodiment comprises a solenoid portion 10 and a valve portion 20, and is fixed into a valve body 30, e.g., it is formed in an oil pan of an electronic automatic transmission. As shown in FIG. 1, the solenoid portion 10 comprises a stator 11 and a plunger 15. The stator 11 is constructed by a hollow cylindrical stator core 12 forming a central bore 12*d*, an electromagnetic coil 14 wound around the stator core 12 and a magnetic cover 13 wrapping the stator core 12 and the electromagnetic coil 14. The stator core 12 is axially constructed by a magnetic yoke 12*a* and a magnetic core 12*b* which are bridged via a non-magnetic pipe 12*c*, and forms an air gap 12*e* as a resistance therebetween. The electromagnetic coil 14 is wound around the stator core 12 to magnetize the same. The cover 13 wraps the stator core 12 and the electromagnetic coil 14, and magnetically connects both ends of the stator core 12. The yoke 12*a* forms a large diameter portion at one axial end opposite to the magnetic core 12*b*. The magnetic core 12*b* forms a flange and a small diameter bore coaxially to the central bore 12*d* at one axial end opposite to the yoke 12*a*. The shape of the cover 13 is like a cup whose inner bottom contacts with the end surface of the stator core 12*a* and whose open end is caulked to connect with the flange of the magnetic core 12*b* and a valve sleeve 21 of the valve portion 20.

The whole of the plunger 15 is a magnetic substance and is slidably fitted into the central bore 12*d* of the stator core 12. The plunger 15 is able to slide between an advanced end position where its one end closest to the valve portion 20 contacts the step at the small diameter bore, and a retracted end position where the other end contacts a central projection 13a formed in the inner bottom of the cover 13. An intermediate space B is formed between one end surface of the plunger 15 closest to the valve portion 20 and one end surface of a third land 26c of a spool 25, described below, in the stator core 12 and the valve sleeve 21. Also, a tip space A is formed between the other end surface of the plunger 15 and the inner bottom surface of the cover 13 in the central bore 12d of the yoke 12a.

As shown in FIG. 1, annular grooves 16b and 16d are respectively formed on both sides of the large diameter portion of the yoke 12a and are connected to each other via an axial passage 16c. A radial passage 16a is formed on the end surface of the yoke 12a opposite to the valve portion 20 and connects the annular groove 16b with the tip space A. The passages 16a and 16c are formed at a 180 degree mutual difference in circumferential position. In addition, an aperture 13b is formed in the circumference of the cover 13 in order to connect the annular groove 16d to the outside at the same circumferential position as the radial passage 16a. Since the cover 13 wraps the large diameter portion of the yoke 12a, there is thus formed a labyrinth inlet/outlet passage 16 between the yoke 12a and the cover 13. Therefore, the tip space A is connected to the outside through the labyrinth inlet/outlet passage 16 and the aperture 13b.

The valve portion 20 comprises the valve sleeve 21 and the spool 25. The valve sleeve 21 coaxially forms a valve bore 22 where the valve spool 25 is slidably fitted into. At one end of the valve sleeve 21, a flange 21a contacts the flange of the core 12b, and both portions 10 and 20 are coaxially fixed to each other by caulking the opening of the cover 13 as mentioned above. A spring 28 is disposed between the spool 25 and a tap 27 screwed into the end of the valve sleeve 21 opposite to the solenoid portion 10 in order to force the spool 25 toward the solenoid portion 10. When assembling, the spool 25 and the spring 28 are put into the valve bore 22 from the right side in FIG. 1 and then the tap 27 is secured to the valve sleeve 21. A spindle 25a projects at the tip of the spool 25 and contacts the end surface of the plunger 15 through the center of the core 12b. Since the plunger 15 is biased by the spring 28 via the spool 25, during rest, the plunger 15 is located at the retracted end position where its end surface opposite to the valve portion 20 contacts the projection 13a formed at the center of the inner bottom of the cover 13.

The spool 25 axially forms a pair of first lands 26a, a second land 26b and a third land 26c in series toward the solenoid portion 10. Sectional areas of those lands 26a-26c are different from each other; the first lands 26 are the largest and the third land 26c is the smallest. Namely, each of the first lands 26a has a large diameter D4, the second land has a middle diameter D3 and the third land has a small diameter D2. The valve bore 22 of the valve sleeve 21 coaxially forms a first bore 22a, a second bore 22b and a third bore 22c in series in order to fit the first, second and third lands 26a-26c into themselves respectively. The first bore 22a forms an axially spaced series of a supply port 23a, a control port 23b and a drain port 23c. The opening areas between the supply port 23a and the control port 23b, and between the control port 23b and the drain port 23c, open/close gradually and inversely due to the axial slide of the first lands 26a of the spool 25.

A feedback space 24 is formed between the first and second bores 22a and 22b. The pressure in the control port 23b is always inputted into the feedback space 24 so that the pressure therein forces the spool 25 against the spring 28 because of the pressurized area difference between the first and second lands 26a and 26b, which difference can be selected to match the electromagnetic attraction force. The feedback space 24 thus stably adjusts the slide of the spool 25 in relation with current applied to the electromagnetic coil 14. Therefore, characteristics of the solenoid valve precisely reflect the relation of the areas between the first and second lands 26a (diameter=D4) and 26b (diameter=D3), and depend on those diameters. Between the second and third bores 22b and 22c, there is internally formed an annular groove 22d connecting to the drain port 23c, whereby the annular groove 22d separates the feedback space 24 and the intermediate space B to prevent oil in one of these chambers from flowing into the other.

The valve sleeve 21 is fixed to the stator core 12 to dispose the third bore 22c next to the solenoid portion 10. The intermediate space B is formed by the end surface of the third land 26c fitted into the third bore 22c, the end surface of the plunger 15, a part of the central bore 12d of the core 12b and a part of the valve bore 22. Section areas of the plunger 15 and the third land 26c are the same; namely the diameter D1 of the plunger 15 equals the diameter D2 of the third land 26c, so that the volume in the intermediate space B does not change even if the plunger 15 and the spool 25 move.

As shown in FIG. 1, in the solenoid valve of the first embodiment, the valve sleeve 21 is fixed in the valve body 30 with liquid tightness. Instead of the valve sleeve 21, the valve bore 22 and the ports 23a-23c may be formed in the valve body 30 itself.

During rest of the solenoid valve while the electromagnetic coil 14 is not energized, the spring 28 forces the plunger 15 and the spool 25 to contact each other and to set the plunger 15 on the central projection 13a of the inner bottom of the cover 13 as the retracted end position. This fully opens the opening between the supply port 23a and the control port 23b, and closes the opening between the control port 23b and the drain port 23c. In this situation, an amount of oil supplied from a pump, not shown, to a hydraulic equipment such as a clutch piston to be controlled, not shown, is supplied via the supply port 23a and the control port 23b. When the electromagnetic coil 14 is energized, the stator core 12 is magnetized and attracts the plunger 15 toward the core 12b, against the force of the spring 28. Therefore, the opening between the supply port 23a and the control port 23b is gradually closed, and inversely the opening between the control port 23b and the drain port 23c is gradually opened, so that the amount of the oil supplied to the hydraulic equipment decreases. When the current is maximum, the plunger 15 contacts the end surface of the small diameter bore of the core 12b as the advanced end position, wherein the opening between the supply port 23a and the control port 23b is fully closed and the opening between the control port 23b and the drain port 23c is fully opened. In this situation, the oil supplied from the pump is drained, so the hydraulic equipment becomes inactive.

In the first embodiment, because the plunger 15 and the third land 26c have the same diameters (D1=D2), there is no change in the volume of the intermediate space B between the plunger 15 and the third land 26c, even when the plunger 15 and the spool 25 move together. Therefore, even without a diaphragm or similar element, contaminants in the oil will not be sucked into the intermediate space B and cannot lodge between the plunger 15 and the central bore 12d of the core 12, so that the plunger 15 will not lock.

The relation of the pressurized area difference between the first and second lands 26a and 26b in the feedback space 24 is set in view of the desired valve force as mentioned above. However the third land 26c does not face the feedback space 24, so that there is no relation between the diameter D2 of the third land 26c constructing the intermediate space B and the diameter D3 of the second land 26b constructing the feedback space 24. Therefore, even if the diameter D1 of the plunger 15 is restricted by the relation between the current and the attraction force, the pressurized areas of the first second lands 26a and 26b, namely diameters D4 and D3, can be made larger while maintaining the same area difference. This makes the solenoid valve of the embodiment respond rapidly.

The volume in the tip space A, formed between the bottom of the cover 13 and the end surface of the plunger 15, changes according to the slide of the plunger 15. However, since the tip space A connects to the outside via the labyrinth inlet/outlet passage 16, the contaminants in the oil hardly reach the tip space A and most of them are eliminated during the opposite sliding movement of the plunger 15.

Iron powder is the contaminant which mainly makes the plunger 15 lock because the iron powder is inclined to be attracted and accumulated around the resistance 12e which concentrates magnetic lines of force. However, the resistance 12e is located next to the intermediate space B opposite to the tip space A so that the iron powder is rarely sucked through the labyrinth inlet/outlet passage 16 and rarely reaches the resistance 12e.

Next, a second embodiment referred to FIG. 2 will be described, but there will be omitted the description of the same elements as in the first embodiment. The second embodiment is also constructed by the solenoid portion 10 and the valve portion 20, and is equipped to the valve body 30 such as the oil pan of the electronically controlled automatic transmission. Although the above mentioned first embodiment is a normally open type of solenoid valve which opens the opening between the supply and control ports 23a and 23b, respectively, when the solenoid is inactive, the second embodiment is a normally closed type of solenoid valve which closes the opening between the supply and control ports 23a and 23b, respectively, when the solenoid is inactive. The other construction and parts are substantially the same as the first embodiment so that the differences will be mainly described below.

Since the solenoid valve of the second embodiment is the normally closed type, the second land 26b of the spool 25 is located behind the pair of the first lands 26a, opposite to the solenoid portion 10. However the third land 26c is located ahead of the first lands 26a, close to the solenoid portion 10, just as in the first embodiment. To permit putting the spool 25 into the valve bore 22 of the valve sleeve 21, there is formed a large diameter bore 22e which is larger than the first bore 22a internal the flange 21a of the valve sleeve 21 at the end of the valve bore 22, at the location of the third bore 22c. The spool 25 is put into the valve bore 22 of the valve sleeve 21 from the side of the flange 21a, and then a bush 21c coaxially forming the third bore 22c is press-fitted and fixed into the large diameter bore 22e and slidably fits the third land 26c of the spool 25 thereinto. Behind the bush 21c, there is formed the annular groove 22d connecting to the outside via the drain port 23c. The feedback space 24 is formed between the first and the second bores 22a and 22b of the valve bore 22. The pressure in the control port 23b is always inputted into the feedback space 24 and forces the spool 25 in the direction of assisting the spring 28. The construction of the second embodiment is otherwise the same as the first embodiment.

In the second embodiment, when the solenoid is inactive, the opening between the supply and the control ports 23a and 23b is closed, but the opening between the control and the drain ports 23b and 23c is fully opened, whereby the oil from the pump is not supplied to the hydraulic equipment but is instead drained through the drain port 23c. When the solenoid becomes active, the openings between the supply and the control ports 23a and 23b, and between the control and the drain ports 23b and 23c, are controlled according to the current flowing through the coil 14, and the oil from the pump is supplied to the hydraulic equipment through the control port 23b.

In the second embodiment, as in the first embodiment, the pressurized area of the plunger 15 is as large as the third land 26c of the spool 25, namely the diameters D1 and D2 are the same, so that the volume in the intermediate space B does not change even if the plunger 15 and the spool 25 move together. Therefore, even without a diaphragm, the contaminants cannot be sucked into the intermediate space B so that the plunger 15 will not lock. In addition, because the lands facing the intermediate space B (the third land 26c) and the feedback space 24 (the first and second lands 26a and 26b) are separated, the diameters D4 and D3 of the first and the second lands can become larger without affecting the current and the attraction. Therefore, the solenoid valve responds quicker.

The second embodiment, just as the first embodiment, forms the tip space A which connects to the outside through the labyrinth inlet/outlet passage 16 formed between the yoke 12a and the cover 13 around the end of the plunger 15 opposite to the valve portion 20, whereby the contaminants (iron powder) in the oil are hardly sucked thereinto. Therefore, the contaminants are not attracted and accumulated to the resistance 12e to cause locking of the plunger 15.

Additionally, in the first and second embodiments, although the intermediate space B is shut off from the outside, as shown in chain double-dashed lines in FIG. 1, an inlet/outlet passage 21b can be formed to connect the intermediate space B with the outside on the end surface of the valve sleeve 21 to be fixed to the core 12b. As mentioned hereinbefore, since the volume in the intermediate space B does not change, such an inlet/outlet passage does not cause contaminants in the oil be sucked into the intermediate space B.

Figure 2:
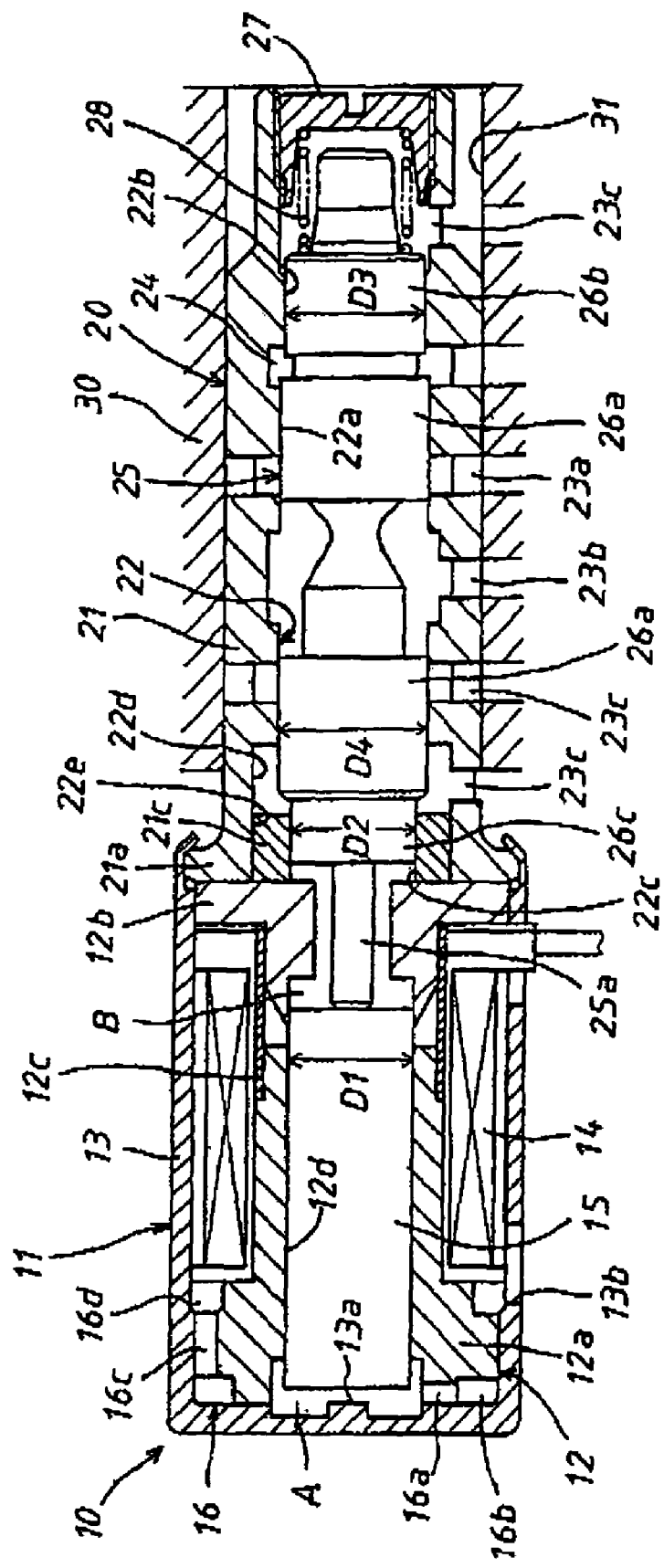
FIG. 2 is a longitudinal section view of a second embodiment of a solenoid valve related to the invention.
Figure 3:
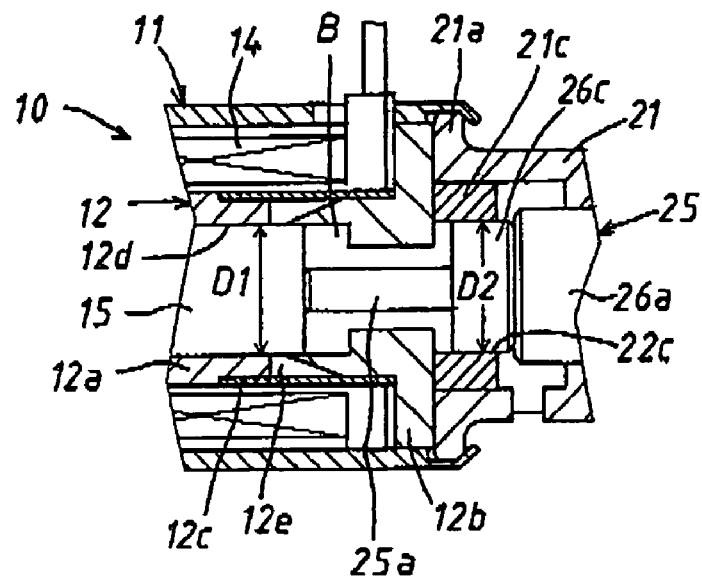
FIG. 3 is a part section view of a modification of the second embodiment.

FIG. 3 shows a modification of the second embodiment shown in FIG. 2. The second embodiment can be modified so that the third land 26c and the spindle 25a are separated form the spool 25 to form a free piston. The free piston integrally is formed of the third land 26c and the spindle 25a, and is disposed between the plunger 15 and the first land 26a of the spool 25. The third land 26c is slidably fitted into the third bore 22c of the bush 21c which is press-fitted and fixed into the large diameter portion 22e of the valve sleeve 21. In this modification of the second embodiment, the concentricity between the third land 26c and the third bore 22c of the bush 21c can be adjusted and can be set separately from the concentricity between the third bore 22c and the other bores 22a and 22b because the bush 21c and the valve sleeve 21 are separated from each other. Therefore, the spool 25 smoothly moves.

Figure 4:
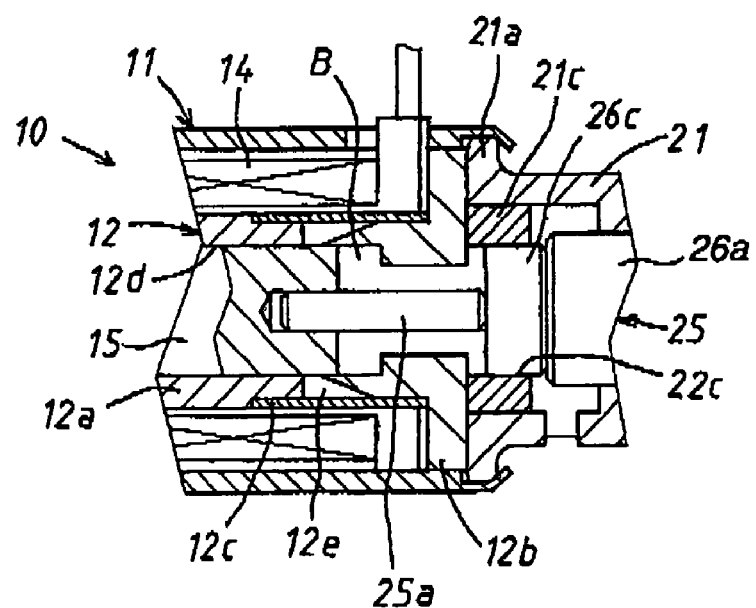
FIG. 4 is a part section view of another modification of the second embodiment.

FIG. 4 shows a further modification of the second embodiment. In this modification, the third land 26c is separated from the spool 25, and further the spindle is separated from the third land 26c and is press-fitted and fixed into the plunger 15.

A third embodiment will be described referring to FIGS. 5 and 6, but a description of the same elements as in the first and second embodiments will be omitted. The solenoid valve of the third embodiment is also constructed by the solenoid portion 10 and the valve portion 20, and is equipped to the valve body 30 such as the oil pan of the electronically controlled automatic transmission. The third embodiment is the same normally open type of solenoid valve as the first embodiment. Unlike the first embodiment, however, the solenoid valve of the third embodiment does not have the third land 26c but forms the intermediate space B between the end surfaces of the second land 26b and the plunger 15. Further, the constructions of the stator core 12 and the inlet/outlet passage are also different from the first embodiment. Hereinafter, the differences will be mainly described.

Figure 5:
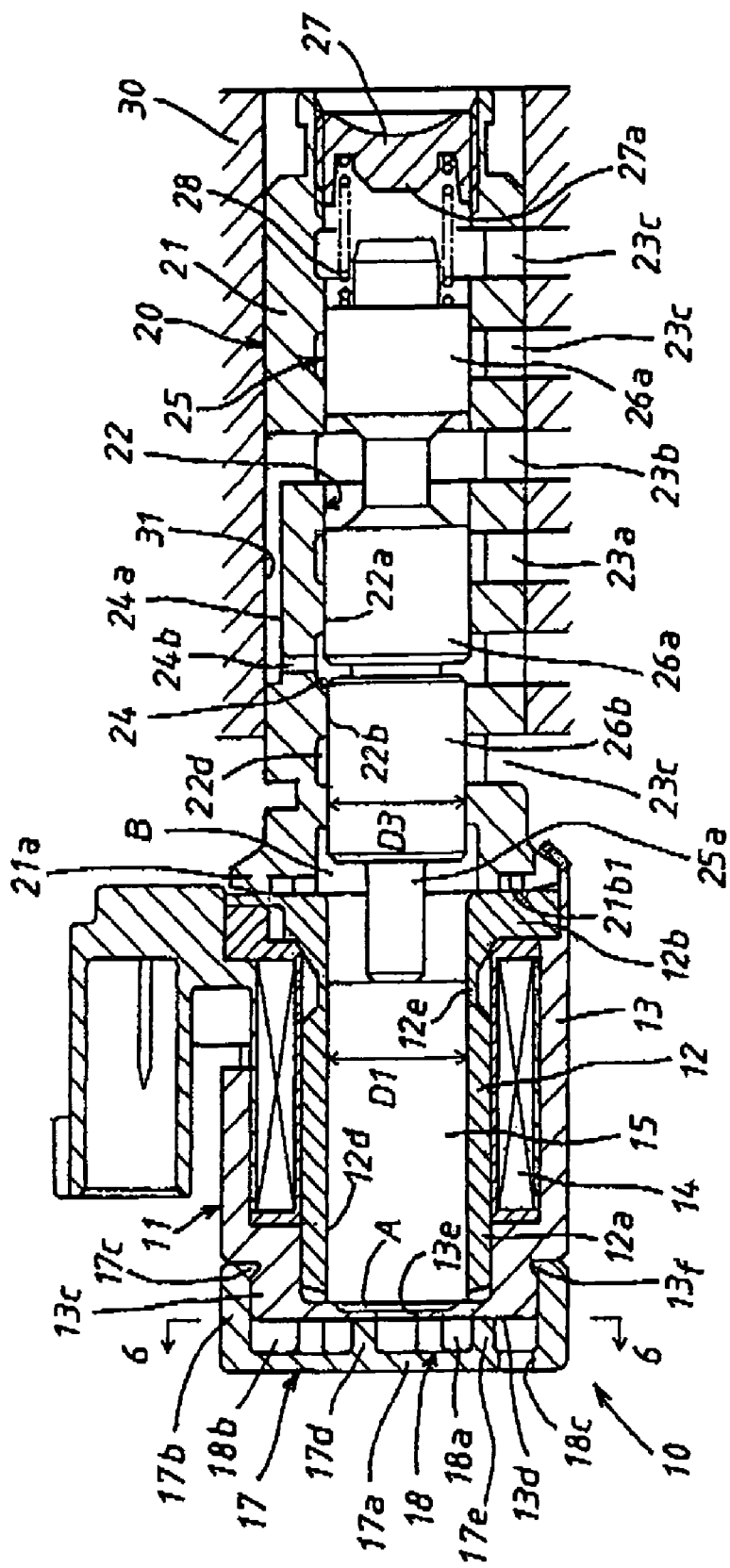
FIG. 5 is a longitudinal section view of a third embodiment of a solenoid valve related to the invention.
Figure 6:
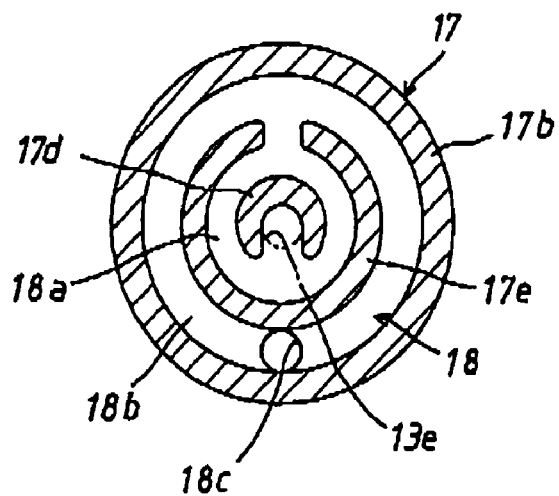
FIG. 6 is a section view along line 6-6 of FIG. 5.

As shown in FIG. 5, the solenoid portion 10 is constructed by the stator 11 and the plunger 15. The stator 11 includes the hollow cylindrical stator core 12 formed integrally, the electromagnetic coil 14 wound around the stator core 12 and a magnetic cover 13 wrapping the stator core 12 and the electromagnetic coil 14 and magnetically connecting both ends of the stator core 12. The integral stator core 12 is magnetic, internally forms the central bore 12d and includes an annular thin portion as the resistance 12e which separates the integral stator core 12 into the yoke 12a and the core 12b. At its end opposite to the yoke 12a, the core 12b forms a flange which connects with the valve sleeve 21 by caulking with the open end of the cover 13. The cuplike cover 13 outwardly forms a step 13c around its bottom and an annular groove 13f at the base of the step 13c. If small bores are formed at the thin portion, magnetic resistance increases at the resistance 12e.

The whole of the plunger 15 is a magnetic substance and is slidably fitted into the central bore 12d of the stator core 12. The plunger 15 is able to slide between the advanced end position where its one end closest to the valve portion 20 contacts the spool 25 which is engaged with a projection 27a formed in the inner bottom of the tap 27, and the retracted end position where the other end contacts with the inner bottom of the cover 13. The intermediate space B is formed in both the stator core 12 and the valve sleeve 21, between one end surface of the plunger 15 closest to the valve portion 20 and one end surface of the second land 26b of the spool 25. Also, the tip space A is formed between the other end surface of the plunger 15 and the inner bottom surface of the cover 13 in the central bore 12d of the yoke 12a. An aperture 13e is formed at the center of the bottom of the cover 13.

As shown in FIG. 5, a cap 17 is attached to the step 13c of the cover 13 to form an inlet/outlet passage 18, and is integrally molded from synthetic resin. As shown in FIGS. 5 and 6, the cap 17 forms a bottom portion 17a, a cylindrical outer portion 17b, a partial cylindrical middle portion 17d and a partial cylindrical inner portion 17e. At the internal tip of the outer portion 17b, there is inwardly formed a clamp portion 17c which elastically clamps to the annular groove 13f at the base of the step 13c. The partial cylindrical middle and inner portions 17d and 17e are concentric and have notches which are mutually circumferentially spaced by 180 degrees. Therefore, between cylindrical portions 17b, 17d and 17e there are formed an inner annular groove 18a and an outer annular groove 18b in labyrinthine. Further, the cap 17 has an aperture 18c in the outer annular groove 18b at a location circumferentially spaced 180 degrees from the notch of the outer portion 17e. Upon attaching the cap 17 to the step 13c of the cover 13, the middle and inner portions 17d and 17e contact the outer bottom 13d of the cover 13, whereby the tip space A connects to the outside via the aperture 13e and the labyrinth inlet/outlet passage 18 (the annular grooves 18a-18b and the aperture 18c).

The valve portion 20 is constructed by the valve sleeve 21 and the spool 25 which is slidably fitted into the valve bore 22 of the valve sleeve 21. The spool 25 forms the first and second lands 26a and 26b but does not have a third land 26c corresponding to that of the first and the second embodiments. As a further difference from the first and second embodiments, the tap 27 forming the projection 27a contacts the spool 25 to restrict the slide of the plunger 15 at its advanced position. In addition, on the flange 21a of the valve sleeve 21 contacting the stator core 21, there may be formed an inlet/outlet passage 21b1 to connect the intermediate space B with the outside. In the third embodiment, the intermediate space B is formed by the end surface of the second land 26b, the end surface of the plunger 15, the central bore 12d of the core 12 and a part of the valve bore 22. The pressurized area of the plunger 15 is as large as the second land 26b, namely the diameters D1 of the plunger 15 and D3 of the second land 26b are the same, so that the volume in the intermediate space B does not change even if the plunger 15 and the spool 25 move.

During rest, as with the first embodiment, the plunger 15 and the spool 25 are located at the retracted end position where the plunger 15 contacts to the bottom of the cover 13. This fully opens the opening between the supply port 23a and the control port 23b, and closes the opening between the control port 23b and the drain port 23c, whereby oil is supplied from the pump to the hydraulic device through the supply and the control ports 23a and 23b. Upon energizing the electromagnetic coil 14, the plunger 15 is attracted to the core 12b and moves the spool 25 by a degree depending on the current. The opening between the supply and the control ports 23a and 23b is thereby closed and the opening between the control and the drain port 23b and 23c is opened, whereby the oil supply to the hydraulic device decreases. When the maximum current is applied, the spool 25 contacts the projection 27a of the tap 27 at the advanced end position, the opening between the supply and the control ports 23a and 23b is fully closed, and the opening between the control and the drain ports 23b and 23c is fully opened. In this situation, the oil does not flow from the pump to the hydraulic device.

In the third embodiment, since the diameter D1 of the plunger 15 is the same as the diameter D3 of the second land 26b, the volume in the intermediate space B formed between each end of the plunger 15 and the second land 26b does not change, whereby the oil including the contaminants is not sucked into the intermediate space B. Therefore, even without a diaphragm or similar element the plunger 15 is prevented from locking due to contaminants lodged between the plunger 15 and the central bore 12d.

The volume in the tip space A formed between the bottom of the cover 13 and the end surface of the plunger 15 changes according to the slide of the plunger 15. However, since the tip space A connects to the outside via the aperture 13e of the cover 13 and the labyrinth inlet/outlet passage 18, the contaminants in the oil hardly reach the tip space A and most of them are eliminated during the opposite movement of the plunger 15. Iron powder is the contaminant which mainly makes the plunger 15 lock, because the iron powder is inclined to be attracted and accumulated around the resistance 12e concentrating the magnetic lines of force. However, the resistance 12e is located next to the intermediate space B opposite to the tip space A so that the iron powder is rarely sucked through the labyrinth inlet/outlet passage 18 and rarely reaches the resistance 12e.

In the third embodiment, the cap 17 is integrally molded from synthetic resin and forms the bottom portion 17a, the cylindrical outer/inner/middle portions 17b/17d/17e for the labyrinth inlet/outlet passage 18 and the clamp portion 17c to elastically clamp to the annular groove 13f at the base of the step 13c of the cover 13. Such a cap 17 can be easily fabricated to make the inlet/outlet passage 18 from only one piece, and can reduce the product cost.

Figure 7:
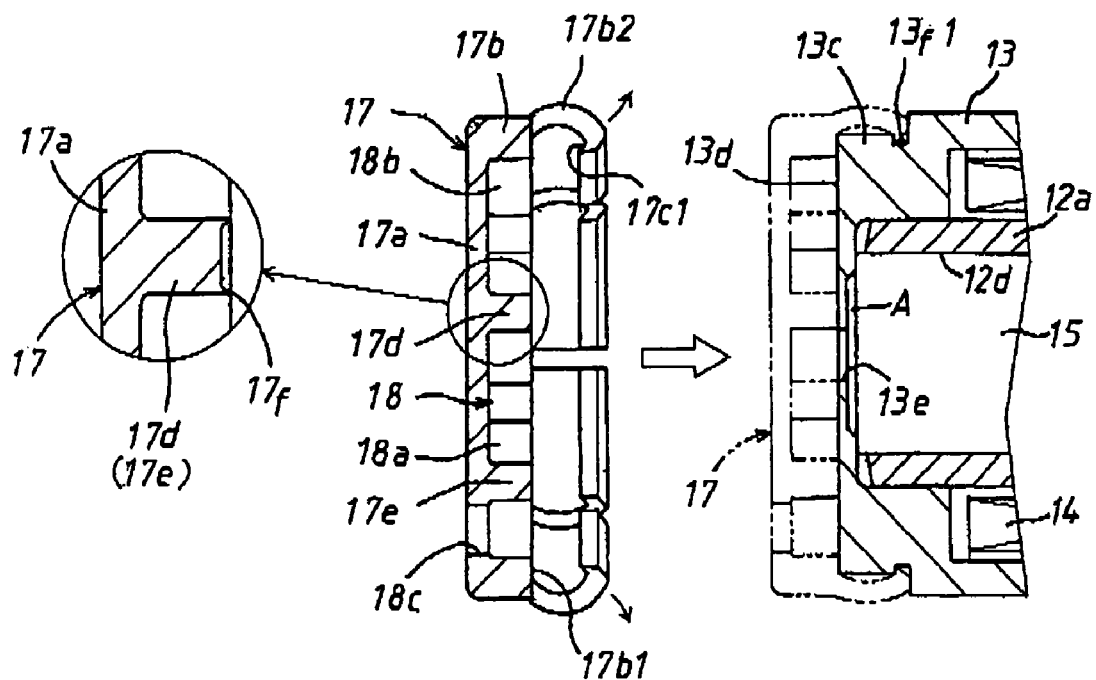
FIG. 7 is a part section view of a modification of a cap of the third embodiment.

Next, referring to FIG. 7, a modification of the third embodiment will be described. In this modification, the cap 17 firmly presses each of the partial cylindrical portions 17d and 17e in the step 13c of the cover 13. The outer cylindrical portion of the cap 17 forms a middle step 17b1 at the middle in the axial direction, and plural (ex. eight) extensions 17b2 which extend axially, curve inwardly and have clamps 17c1 at each of the ends. The inner portion 17d and the middle portion 17e have seal lips 17f at each of the tips to contact the step 13c of the cover 13. The cap 17 is attached into the cover 13 by clamping at the annular groove 13f1 formed at the base of the step 13c via the clamps 17c1, as shown with chain double-dashed lines in FIG. 7. The cap 17 elastically extends the extensions 17b2, and firmly presses the tips of the middle step 17b1 and the partial cylindrical portions 17d-17e onto the cover 13 because of the elastic reaction force of the extensions 17b2. Additionally, the seal lips 17f improve the seal at the tips of the portions 17d-17e. Therefore, fluid leaks at the inlet/outlet passage 18 decrease between the cap 17 and the cover 13 and the contaminants in the oil are more rarely sucked thereinto.

Obviously, numerous modifications and variations of the present invention are possible in light of the above teachings. It is thereby to be understood that within the scope of the appended claims, the present invention may be practiced otherwise than as specifically described herein.

What is claimed is:

1. A solenoid valve comprising:
   a solenoid portion comprising a stator core, an electromagnetic coil wound around said stator core, and a plunger axially moving in said stator core when said electromagnetic coil is energized;
   a valve portion comprising a valve sleeve, a spool forming plural lands and axially moving in said valve sleeve, and a spring biasing said spool; and
   wherein said solenoid portion and said valve portion are coaxially fixed in series such that said plunger and the spool are coaxially disposed in series with an intermediate space therebetween, whereby said spring biases said plunger via said spool, which spool can be moved by said plunger due to an energization of said electromagnetic coil, wherein the intermediate space is defined in part by facing portions of said plunger and one of the lands of said spool, and wherein said facing portions have equal diameters so that the volume in the intermediate space does not change during movement of the spool,
   wherein said valve portion comprises a supply port, a control port and a drain port, and further comprises a feedback space formed between two of the lands of said spool, which lands have different diameters, and wherein said feedback space is arranged to receive a pressure in the control port,
   wherein the one of the lands defining said intermediate space is separated from said feedback space by at least one additional land.

2. A solenoid valve according to claim 1, wherein said spring biases said spool to a normally open position in which the supply port communicates with the control port.

3. A solenoid valve according to claim 1, wherein:
   said solenoid portion comprises a cuplike cover wrapping said stator core and said electromagnetic coil; and
   a tip space is formed at an end of said plunger opposite said valve portion and connects to the outside through a labyrinth passage formed at said cover.

4. A solenoid valve according to claim 3, wherein said spring biases said spool to a normally open position in which the supply port communicates with the control port.

5. A solenoid valve, comprising:
   a solenoid portion comprising a stator core, an electromagnetic coil wound around said stator core, and a plunger axially moving in said stator core when said electromagnetic coil is energized;
   a valve portion comprising a valve sleeve, a spool forming plural lands and axially moving in said valve sleeve, and a spring biasing said spool; and
   wherein said solenoid portion and said valve portion are coaxially fixed in series such that said plunger and the spool are coaxially disposed in series with an intermediate space therebetween, whereby said spring biases said plunger via said spool, which spool can be moved by said plunger due to an energization of said electromagnetic coil, wherein the intermediate space is defined in part by facing portions of said plunger and one of the lands of said spool, and wherein said facing portions have equal diameters so that the volume in the intermediate space does not change during movement of the spool,
   wherein said valve portion comprises a supply port, a control port and a drain port, and further comprises a feedback space formed between two of the lands of said spool, which lands have different diameters, and wherein said feedback space is arranged to receive a pressure in the control port,
   wherein the one of the lands defining said intermediate space is separated from said feedback space,
   wherein said spring biases said spool to a normally closed position in which the control port communicates with the drain port.

6. A solenoid valve comprising:
   a solenoid portion comprising a stator core, an electromagnetic coil wound around said stator core, and a plunger axially moving in said stator core when said electromagnetic coil is energized;
   a valve portion comprising a valve sleeve, a spool forming plural lands and axially moving in said valve sleeve, and a spring biasing said spool; and
   wherein said solenoid portion and said valve portion are coaxially fixed in series such that said plunger and the spool are coaxially disposed in series with an intermediate space therebetween, whereby said spring biases said plunger via said spool, which spool can be moved by said plunger due to an energization of said electromagnetic coil, wherein the intermediate space is defined in part by facing portions of said plunger and one of the lands of said spool, and wherein said facing portions have equal diameters so that the volume in the intermediate space does not change during movement of the spool, wherein said solenoid portion comprises a cuplike cover wrapping said stator core and said electromagnetic coil, and a tip space is formed at an end of said plunger opposite said valve portion and connects to the outside through a labyrinth passage formed at said cover,
   wherein a cap forming said labyrinth passage is attached to said cover.

7. A solenoid valve according to claim 6, wherein said cap forms partial cylindrical portions arranged with angular phase differences.

8. A solenoid valve comprising:
   a solenoid portion comprising a stator core, an electromagnetic coil wound around said stator core, and a plunger axially moving in said stator core when said electromagnetic coil is energized;
   a valve portion comprising a valve sleeve, a spool forming plural lands and axially moving in said valve sleeve, and a spring biasing said spool; and
   wherein said solenoid portion and said valve portion are coaxially fixed in series such that said plunger and the spool are coaxially disposed in series with an intermediate space therebetween, whereby said spring biases said plunger via said spool, which spool can be moved by said plunger due to an energization of said electromagnetic coil, wherein the intermediate space is defined in part by facing portions of said plunger and one of the lands of said spool, and wherein said facing portions have equal diameters so that the volume in the intermediate space does not change during movement of the spool, wherein said solenoid portion comprises a cup-like cover wrapping said stator core and said electromagnetic coil, and a tip space is formed at an end of said plunger opposite said valve portion and connects to the outside through a labyrinth passage formed at said cover, wherein said spring biases said spool to a normally closed position in which the control port communicates with the drain port.

* * * * *